United States Patent [19]

Sekella

[11] Patent Number: 4,566,575
[45] Date of Patent: Jan. 28, 1986

[54] SELF-ADJUSTING ELECTROMAGNETIC CONE BRAKE

[75] Inventor: T. Curran Sekella, Elmira, N.Y.
[73] Assignee: Facet Enterprises, Inc., Okla.
[21] Appl. No.: 336,103
[22] Filed: Dec. 30, 1981
[51] Int. Cl.[4] .................. F16D 13/75; F16D 27/10; F16D 65/52
[52] U.S. Cl. .................. 192/84 C; 188/71.9; 188/196 F; 192/90; 192/111 A
[58] Field of Search .................. 192/111 A, 90, 84 B, 192/84 C; 188/71.9, 196 F

[56] References Cited

U.S. PATENT DOCUMENTS

| | | | |
|---|---|---|---|
| 2,057,876 | 10/1936 | Berry | 192/84 B |
| 3,994,379 | 11/1976 | Miller et al. | 192/111 A |
| 4,030,583 | 6/1977 | Miller | 192/111 A X |
| 4,175,650 | 11/1979 | Miller | 192/111 A X |
| 4,187,938 | 2/1980 | Miller | 192/84 C X |
| 4,194,610 | 3/1980 | Miller | 192/111 A |
| 4,258,836 | 3/1981 | Miller | 192/111 A X |
| 4,285,420 | 8/1981 | Sekalla | 192/84 C |
| 4,416,359 | 11/1983 | Miller | 192/84 C X |

Primary Examiner—Rodney H. Bonck
Attorney, Agent, or Firm—Remy J. VanOphem

[57] ABSTRACT

An electromagnetic friction device for torque transmission including an input member and an output member. A mechanism for transmitting torque from the input member to the output member is provided. The torque transmitting mechanism includes an adjustable friction ring member, an inner ring member threadably disposed in the friction ring member and a biasing mechanism. The biasing mechanism urges the adjustable friction ring member into engagement with the input member. An electromagnetic actuating mechanism is mounted adjacent to the output member to move the friction ring member into and out of engagement with the input member. An adjusting mechanism of the electromagnetic actuating mechanism is adapted to adjust the magnetic armature member with respect to the adjustable friction ring member. The adjusting mechanism includes a helical biasing member mounted on a connector which connects the armature member to the friction ring member. The helical biasing member has one radial end portion which is contiguous with the threaded first inner diameter of the friction ring member and an opposite radial end portion which is contiguous with a knurled second inner diameter of the friction ring member. The one radial end portion provides controlled rotational drag during adjustment for wear between the inner body member and the friction ring member. The opposite radial end portion in conjunction with the knurled second inner diameter permits unidirectional rotational movement of the inner body member relative to the friction ring member.

20 Claims, 3 Drawing Figures

SELF-ADJUSTING ELECTROMAGNETIC CONE BRAKE

FIELD OF THE INVENTION

This invention relates to electromagnetically actuated frictional devices and more specifically an electromagnetic self-adjusting cone brake which incorporates a fail-safe feature actuating the brake upon a power failure, while also providing a frictional retarder and self-adjusting air gap mechanism to extend the life of the brake.

BACKGROUND OF THE INVENTION

Fail-safe electromagnetically operated brake devices have been found to be particularly desirable in applications where an electrical power failure is a possibility. In those applications it is desirable, upon loss of electrical power, to engage the brake in order to bring a device to a complete standstill condition and maintain the standstill condition until power has been restored. For example, in an electric lift truck, it would be desirable, in the case of an electrical system failure, to stop the forks in the position that they attained prior to the electrical failure. This would insure that the lift with its heavy load would not drop to the floor and cause serious damage. Also, in a lift truck, the fail-safe electromagnetic brake can be used when the engine stalls so the truck would come to a complete standstill condition upon power failure.

Other uses of this type of device are in an elevator where it would be necessary to stop the elevator in case of a power failure. Thus, in general, the fail-safe electromagnetic brake is used in any application where it is desired, in cases of a loss of electrical power, to stop functioning of certain electrical components to avoid a major breakdown or disaster.

Such applications place particular requirements on the brake device in that generally the brake device must be simple and economically constructed and at the same time provide positive engagement under a high torque absorption in order to enable the mechanical system in which the brake is utilized to safely avoid continuation of the event cycle. A brake in such a system may be either off or on for long periods of time or cycled on and off for short periods of time depending on the application requirements. Thus, the brake must be sufficiently durable to withstand constant use with a minimum amount of wear.

One prior art design utilizing an electromagnetic clutch or brake with a self-adjusting feature is shown in Miller et al, U.S. Pat. No. 3,994,379, owned by the assignee of the present application. In this embodiment, the friction member is threadably engaged to an armature with relative motion in one direction prevented between the armature and the friction member by a self-adjusting retarder. The fingers of the retarder act upon a knurled surface on the armature to prevent relative motion in one direction between the armature and the friction member on disengaging of the electromagnetic coil. The retarder member only permits the armature to rotate in one direction relative to the friction member, that is, as the frictional surface wears away. As wear occurs, and the electromagnetic coil is energized, the rotating armature and friction member are moved axially towards the pole faces. The rotational velocity of the armature is decreased by the static condition of the pole faces. The friction cone member, which continues to rotate at the input shaft speed, is caused to move axially forward along the mutually engageable thread between the friction member and the armature, that is, towards the brake, thereby advancing the friction surface of the friction member into engagement with its mating surface to apply the brake.

This self-adjusting brake device is, however, complex, difficult to assemble and expensive to manufacture. Further, it has been found that it is difficult to make and expensive because of the many manufacturing steps required to form the retarder member. Furthermore, this device, while self-adjusting, is not fail-safe.

A further improvement to the aformentioned design is shown in Miller, U.S. Pat. No. 4,030,583, also owned by the assignee of the present application. U.S. Pat. No. 4,030,583 teaches a fail-safe electromagnetic cone clutch or brake device for transmitting torque from an input means to an output means. The input means includes a clutch actuating mechanism including an electromagnetic winding, an armature coaxially disposed with the input means and threadably connected to a driving friction ring member. The driving friction ring member is splined to move axially on an inner body member which is mounted to the input shaft. When the clutch is de-energized, biasing springs move the friction cone ring member against the output means thus transmitting torque from the friction ring to the output means. When the electromagnetic winding is energized, a circular flux path is generated between the inner body member and the armature located adjacent to the inner body member. The armature is threadably connected to the friction ring member. When the electromagnetic winding is energized, the armature pulls the friction ring member away from the output means thereby stopping the transmittal of torque from the input means to the output means. The friction device maintains this position until the electromagnetic winding is again de-energized. A retarder member is disposed adjacent to the armature to permit engagement of the friction ring member to the output means without adverse wear on the armature. The retarder member has a plurality of tabs on its outer diameter corresponding to a plurality of grooves on the inner surface of the opposite end portion of the friction ring member.

This fail-safe self-adjusting brake is, however, also complex, difficult to assemble and expensive to manufacture. In particular, knurling the opposite face of the armature member has proven to be difficult in production. In addition, the retarder member with its plurality of tabs and spring-like fingers are expensive to make. Further, this device permits excessive overadjustment of the armature member relative to the friction member.

Therefore, none of the aforementioned designs provides a simple, reliable, self-adjusting, fail-safe electromagnetic brake which prevents excessive overadjustment during the wear compensating mode and provides a retarder member which is expensive and simple to make.

SUMMARY OF THE INVENTION

The present invention relates to fail-safe electromagnetic brake devices and provides a simple, inexpensive, unidirectional retarder member which provides a controlled rotational drag between the armature member and the friction ring member during the wear compensation mode to avoid excessive overadjustment as well as random rotation of the armature member relative to the friction member when the electromagnet is de-energized.

The present invention relates to an electromagnetic cone friction device for torque transmission from an input means to an output means, utilizing a torque transmission mechanism. The output means is coaxially disposed with the input means. The torque transmitting mechanism further includes an adjustable friction ring member, an inner ring member coaxially disposed with the adjustable friction ring member, and a biasing mechanism which urges the adjustable friction ring member into engagement with the input means. In addition, an electromagnetic mechanism for actuating the friction ring member out of engagement with the output means is also provided. The electromagnetic actuating mechanism is mounted adjacent to the output means. The electromagnetic actuating means includes a magnetic armature member mounted adjacent to the adjustable friction ring member and a mechanism for adjusting the electromagnetic armature with respect to the adjustable friction ring member.

It is, therefore, a primary object of the present invention to provide an electromagnetic friction device with a simple and economical thread adjustment member which provides a controlled rotational drag on the thread of the friction ring member to prevent overadjustment during the wear compensation phase and to prevent relative motion between the armature plate and the friction ring member when the electromagnetic coil is energized. In addition, the wear compensator member allows rotational movement of the armature in one direction and prevents rotational movement of the armature in the opposite direction.

Another object of this invention is to provide an electromagnetic clutch or brake which has a simplified wear compensator member to automatically maintain the clutch armature in close relative engagement with the electromagnetic pole faces regardless of the wear experienced by the torque transmitting friction member and to prevent excessive overadjustment during the wear compensation mode by providing a drag on the thread surfaces and yet prevent the armature and inner ring from drifting rotatably along the threads within the friction member.

Another object of this invention is to provide an efficient electromagnetic fail-safe brake with a new and economical wear compensating mechanism. Other objects and advantages of this invention will become apparent from the following detailed description taken in conjunction with the accompanying drawings.

DETAILED DESCRIPTION OF THE PREFERRED EMBODIEMENT

Figure 1:
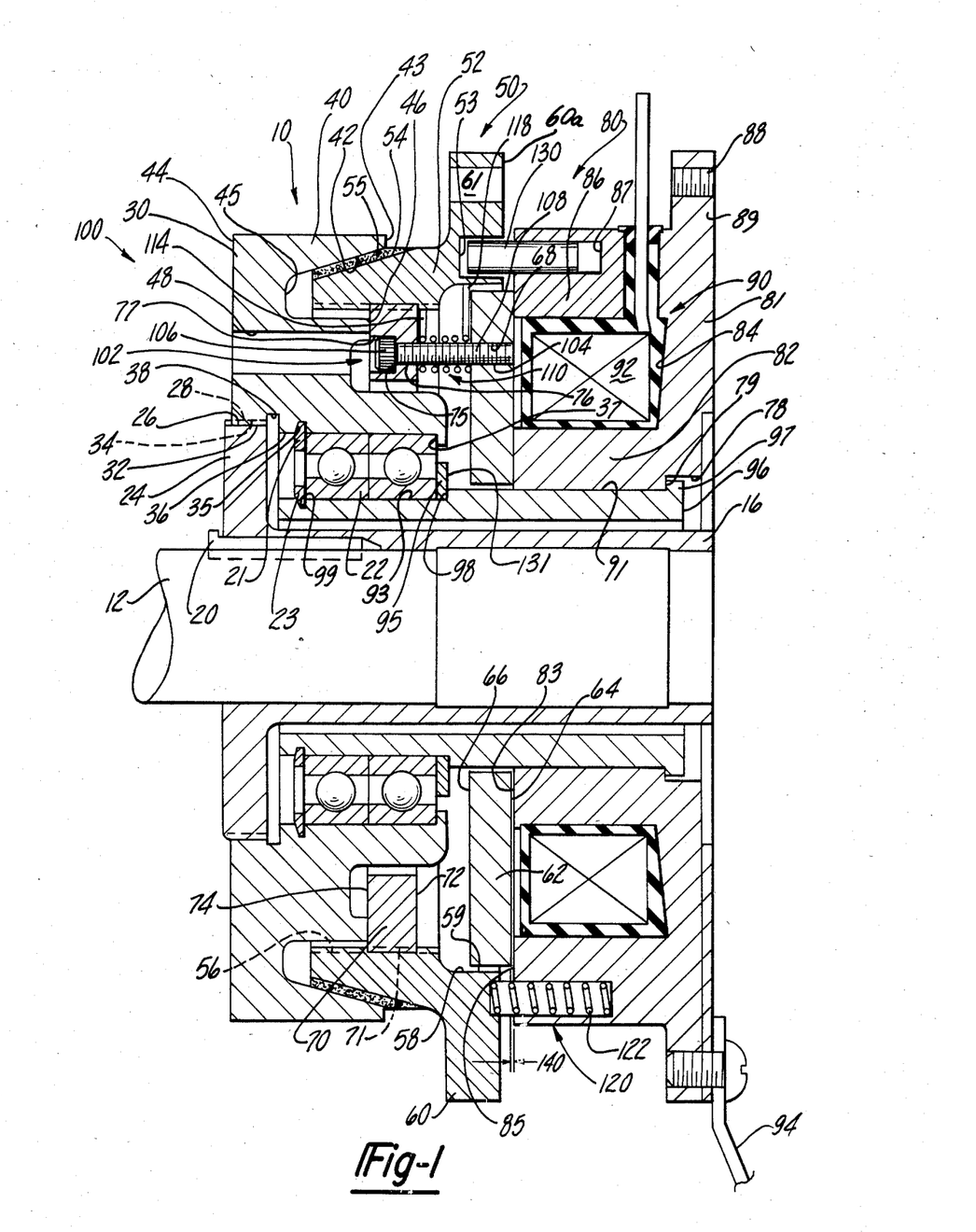
FIG. 1 is a partial sectional view of the preferred embodiment of the invention showing the torque transmitting elements in the engaged position.

Referring to FIG. 1, an electromagnetic friction clutch device or brake assembly is generally designated by the numeral 100 and is provided for transmitting torque from the input means 10 to a stationary output means 80. The electromagnetic friction clutch or brake 100 includes a torque translating means 50.

The input means 10 includes an input shaft 12, a sleeve or an intermediate shaft 16, and an outer member 30. The intermediate shaft 16 is mounted for rotation with the input shaft 12 by means of a key 20 between the intermediate shaft 16 and the input shaft 12. The intermediate shaft 16 further has a radially extending portion 24 formed at the one end thereof. The radially extending portion 24 has an outer cylindrical surface 26 upon which a plurality of axial splines 28 are formed.

The outer member 30 has a plurality of cooperating axial splines 32 formed on a first partial bore 34 formed axially therethrough for cooperative engagement with the axial splines 28 on the outer cylindrical surface 26 of the radially extending portion 24. The outer member 30 further has a second axial bore 36 therethrough having a diameter which is smaller than the diameter of the first partial bore 34. Between the first partial bore 34 and the second axial bore 36 is a counterbore 38 provided for a purpose to be described later herein. One end of the outer member 30 has a frusto-conical annular portion 40 with an inner frusto-conical surface 42 which is tapered radially inwardly towards the axis of the outer member 30. The outer member 30 is the principal torque transmitting member of the input means 10. Although the frusto-conical annular portion 40 is shown in FIG. 1 as being integrally formed as part of the outer member 30, it is optionally possible to form the frusto-conical annular portion separately and secure it to the outer member 30. Alternatively, it is possible to fasten friction material to the frusto-conical surface 42 of the frusto-conical annular portion 40. Between annular faces 43 and 44 of the outer member 30, extends a cavity 45 from the one annular face 43 towards the other annular face 44 near the outer diameter of the outer member 30. The outer member 30 further has an annular inner face 46 which is normal to the axis of the input shaft 12, for a purpose to be described later herein. The outer member 30 further has a plurality of apertures 48 which extend from the annular face 44 to the annular inner face 46.

The output means 80 includes two concentrically disposed body portions 82 and 86 which form one integral output body. In order to establish two separate flux conducting surfaces, the radially inner body portion of the output means 80 is separated from the radially outer body portion 86 by an annular cavity 84. This feature facilitates establishing two poles, as is well known in the art and will not be discussed further.

Electromagnetic actuating means 90 are provided including an electromagnetic winding or coil 92 which is disposed within the annular cavity 84 in the output means 80 and is retained therein by any suitable adhesive, such as epoxy. The coil 92 may be manufactured from copper wire or any other suitable material and is suitably connected to a D.C. power source and an electrical control means (not shown). The electromagnetic actuating means 90 is axially fixed and nonrotatably mounted with respect to the input shaft 12 of the input means 10. For this purpose, the output means has threaded apertures 88 on a flange portion 89 attached to its outer diameter which is suitably secured to a stationary member 94.

The output means 80 further includes an intermediate elongated annular member 96 which is disposed concentric with the intermediate shaft 16 and the input shaft 12. The inner diameter of the intermediate annular member 96 is larger than the outer diameter of the intermediate shaft 16 so that there is no connection between the intermediate shaft 16 and the intermediate annular member 96. The intermediate annular member 96 further has a radially extending portion 97 at one end which abuts against a shoulder 79 in the counterbore 78 of the output means 80. The outer diameter of the intermediate annular member 96 is slightly larger than the inner diameter of the output means 80 to provide a press fit therebetween. The intermediate annular member 96 further extends axially from the shoulder 79 of the output means 80 towards the counterbore 38 in the outer member 30. A radial shoulder 98 between the outer two ends of the intermediate annular member 96 establishes two outer diameters 91 and 93. On the outer diameter 91 nearest the radially extending portion 97 is mounted the radially inner body portion 82. The other outer diameter 93 of the intermediate annular member 96 extends within the second axial bore 36 of the outer member 30. The outer member 30 is mounted to the intermediate annular member 96 by a pair of conventional ball bearing members 22 which are mounted inbetween the second axial bore 36 of the outer member 30 and the other outer diameter of the intermediate annular member 96. The outer member 30 is secured against an axial movement along the intermediate annular member 96 by a first and second retainer ring 21 and 23 and by the cooperation of a radial shoulder 37 of the outer member 30 with the ball bearing member 22. The radial shoulder 37 extends radially inwardly from the second axial bore 36 to abut one face of the ball bearing member 22. The first retainer ring 21 fits in an appropriate groove 35 in the second axial bore 36 of the outer member 30. The second retainer ring 23 is mounted in an appropriate groove 99 of the intermediate annular member 96. Between the radial shoulder 98 and the one face of the ball bearing member 22 along the second inner diameter of the intermediate annular member 96 is disposed a wave spring washer 95 and flat washer 131 to take up any built up manufacturing tolerance.

Torque translating means 50 are provided between the input means 10 and the output means 80. The torque translating means 50 includes the electromagnetic actuating means 90, an adjustable friction ring member 52, an annular magnetic armature member 62, an inner ring member 70, connecting means 102, helical biasing means 100, biasing means 120 and pin members 130. The annular magnetic armature member 62, the adjustable friction ring member 52 and the inner ring member 70 are coaxially disposed relative to the input shaft 12.

The adjustable friction ring member 52 is generally frusto-conically shaped in cross-section and has a radially inwardly sloping frusto-conical surface 54 upon which friction material 55 is fastened thereto. The friction material 55 on the frusto-conical surface 54 of the adjustable friction ring member 52 is adapted to frictionally engage with the mating frusto-conical surface 42 of the frusto-conical annular portion 40 of the outer member 30. The adjustable friction ring member 52 further has a threaded first bore 56 adjacent to one end. The adjustable friction ring member 52 further has an annular flange 60 extending radially therefrom and a second bore 58 adjacent the extended radial flange. The second bore 58 extends partly from the surface 60a towards the one end with the diameter of the second bore being larger than that of the threaded first bore 56. The second bore has a knurled surface 59 to cooperate with the helical biasing means 110, in a manner to be described later herein.

The annular magnetic armature member 62 is coaxially disposed at least partially within the second bore 58 of the adjustable friction ring member 52. Thus, the annular armature has an outer diameter which is substantially smaller than the second bore of the adjustable friction ring member 52. The annular magnetic armature member 62 further has an axial bore therethrough having an inner diameter which is substantially larger than the outer diameter portion 91 of the intermediate annular member 96. The annular armature member has a first face 64 which is normal to the input shaft axis and adjacent to the pole face 83 of the radially inner body portion 82 of the output body 81 and the pole face 85 formed on the radially outer body member 86 thereof. The annular magnetic armature member 62 further has a second face portion 66 which is opposite to the first face 64. A threaded hole or aperture 68 is formed in the annular magnetic armature member 62 and extends from the second face 66 to the first face 64 for a purpose to be described later herein.

The inner ring member 70 has a threaded outer cylindrical surface 71 which cooperatively engages the threaded first bore 56 of the adjustable friction ring member 52. The inner ring member 70 further has an annular face 72 which is disposed adjacent and parallel to the second face 66 of the annular magnetic armature member 62. The inner ring member 70 further has an opposite face 74 and an aperture 76 which extends from the one face 72 through the opposite face 74. In addition, a counterbore 77 extends partially from the opposite face 74 towards the face 72 and forms a shoulder portion 75 between the opposite face 74 and the face 72 of the inner ring member 70. The opposite face 74 is disposed adjacent to the first annular face 46 of the outer member 30. Furthermore, the axis of the apertures 48 formed in the outer member 30 are radially aligned with the axis of the threaded aperture 76 of the inner ring member 70 and the axis of the threaded aperture 68 of the annular magnetic armature member 62 for a purpose to be described later herein.

The inner ring member 70 is connected to the annular magnetic armature 62 by connecting means 102. The preferred connecting means 102 includes a threaded member 104 having a head portion 106 and a threaded neck portion 108. The threaded member 104 is inserted through the aperture 48, and through the aperture 76 in the inner ring member 70, and engages the threads in the threaded aperture 68 of the annular magnetic armature member 62. The head portion 106 of the threaded member 104 further abuts against the shoulder portion 75 formed between the aperture 76 of the counterbore 77 to permit adjustment of the annular magnetic armature member 62 relative to the inner ring member 70 by rotating the threaded member 104 and thereby to permit adjustment of the air gap 140.

Figure 2:
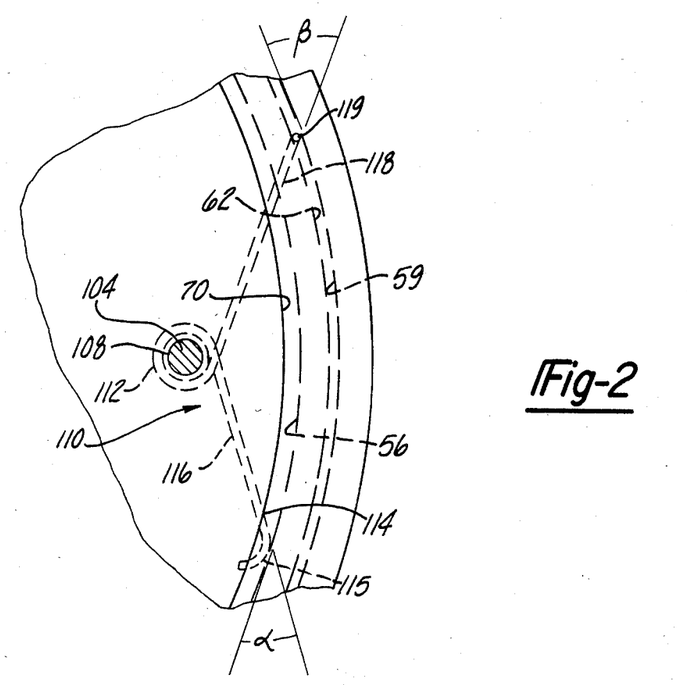
FIG. 2 is a fragmentary sectional view showing the armature member, inner body member, friction ring member, threaded connector and the wear compensating member.
Figure 3:
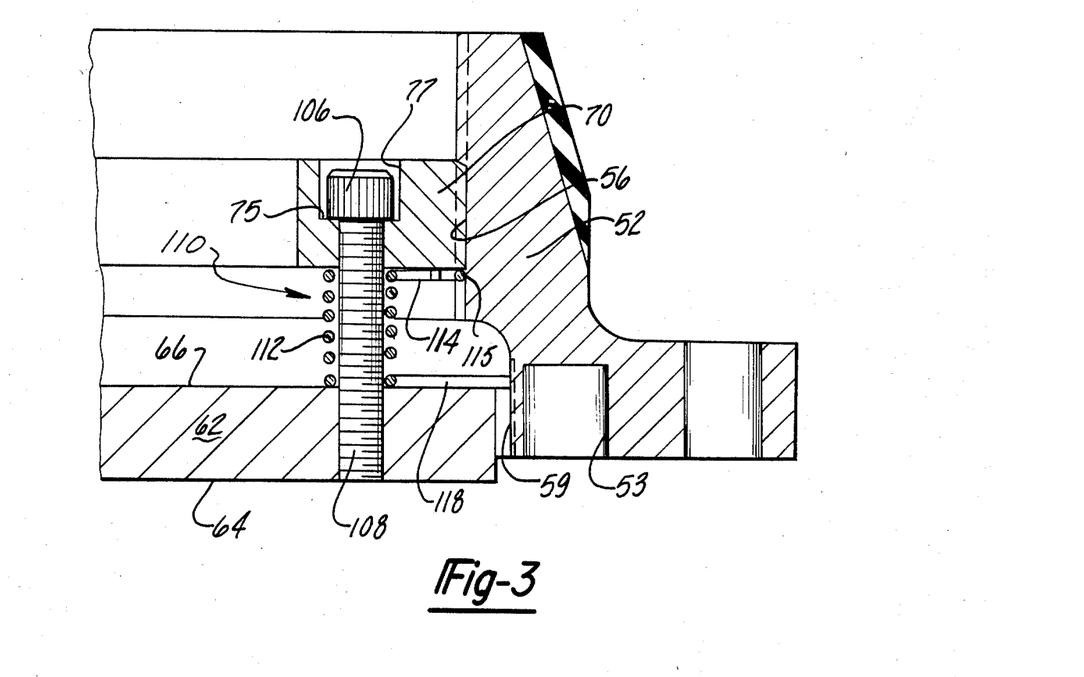
FIG. 3 is a partial sectional view taken along line 3—3 of FIG. 2 showing the wear compensator member engaging the threaded surface and knurled surface of the friction ring member.

With reference to FIGS. 1 and 3, the helical biasing means 110 is mounted between the annular magnetic armature member 62 and the inner ring member 70. The helical biasing means 110 includes a helical biasing member 116 having a coiled body portion 112 which is mounted around the threaded neck portion 108 of the threaded member 104. The helical biasing member 116 further has a first radial end portion 114 and a second radial end portion 118. The first radial end portion 114 is adjacent to the first annular face 72 of the inner ring member 70 and the second radial end portion 118 is adjacent to the second face 66 of the annular magnetic armature member 62. The first radial end portion 114 further has an arcuately shaped end 115 (FIGS. 2 and 3) which slidably engages the root diameter of the threaded first bore 56 of the adjustable friction ring member 52. Thus, as best shown in FIG. 2, the first radial end portion 114 extends radially of the coil body portion 112 such that when the arcuately shaped end 115 engages the threaded first bore 56 of the adjustable friction ring member 52, the first radial end portion 114 forms an angle (alpha α, FIG. 2) to the threaded first bore 56.

Similarly, the second radial end portion 118 also extends radially from the coil body portion 112 in a direction away from the coil body portion 112. The second radial end portion 118 further has an abutment end 119 which engages the knurled surface 59 on the second inner bore 58 of the adjustable friction ring member 52. In addition, the second radial end portion 118 forms an angle (beta, FIG. 2) with the knurled surface 59. In the preferred embodiment, the angle beta is less than 90 degrees. The first radial end portion 114 and the second radial end portion 118 extend radially from the coil body portion 112 so that each end portion develops a biasing force in order to insure that the arcuately shaped end 115 is urged into contact with the threaded first bore 56 of the adjustable friction ring member 52 and the abutment end 119 is likewise urged into engagement with the knurled surface 59 of the adjustable friction ring member 52.

The adjustable friction ring member 52 is connected to the output means 80 by means of a plurality of pin members 130. The pin members are disposed in opposing recesses formed in the adjustable friction ring member 52 and the output means 80. For this purpose, as shown in FIG. 1, the radial outer body portion 86 of the output means 80 has a plurality of axially extending recesses 87 in the pole face 85. Similarly, a plurality of opposing axially extending recesses 53 is formed in the face 60a of the adjustable friction ring member 52 so as to be opposite the axially extending recesses 87 formed in the output means 80. A pin member 130 is inserted into each of the axially extending pairs of recesses 53 and 87 such that the one end of the pin member is inserted into the axially extending recess 53 in the friction ring member 52 with a relatively loose sliding fit while the opposite end of the pin member 130 is inserted into the axially extending recess 87 formed in the output means 80 with a relatively tight fit. Thus, the adjustable friction ring member 52 can move axially relative to the axis of the input shaft 12 but is prevented from rotation by the pin members 130.

The biasing means 120 includes a plurality of helical biasing members 122 which are disposed in alternate axially extending recesses 53 and 87 so as to urge the adjustable friction ring member 52 away from the output means 80. These helical biasing members 122 provide the fail-safe feature of the friction brake 100. This fail-safe feature causes the engagement of the adjustable friction ring member 52 with the input means 10 in the event of an electrical failure which causes the electromagnetic actuating means 90 to stop functioning.

The friction brake 100 is further provided with a manual release capability so that, in event of electrical failure, the brake may be released manually. For this purpose, at least one, and preferably two, of the apertures 61 in the annular flange 60 of the adjustable friction ring member 52 are aligned with a corresponding number of the apertures 88 in the annular flange portion 89 of the output means 80. To actuate the manual release, a threaded connector member (not illustrated) is inserted into an aperture 61 of the flange 60 so that the threaded portion of the threaded connector member engages the thread in the threaded apertures 88 of the flange portion 89 of the output means 80. The head portion of the threaded connector member abuts against one face of the annular flange 60. When the threaded connector is rotated, the adjustable friction ring member 52 is driven axially in a direciton towards the electromagnetic actuating means 90, overcoming the biasing force of the helical biasing members 122 between the adjustable friction ring member 52 and the output means 80. Thus, by rotating the threaded connector, the first face 64 of the annular magnetic armature member 62 is moved until it abuts against the pole faces 83 and 85 of the output means 80 and the friction material 55 is disengaged from the frusto-conical surface 42 of the outer member 30 of the input means 10.

It should be noted that the biasing force of the helical biasing means 110 which is between the annular magnetic armature member 62 and the inner ring 70 remains constant despite the movement of the inner ring 70 and the armature plate relative to the adjustable friction ring member 52. This is so because the threaded connector member maintains the annular magnetic armature member 62 and the inner ring member 70 axially fixed with respect to each other. However, because the apertures 48 in the outer member 30 are radially aligned with the aperture 76 and the counterbore 77 in the inner ring member 70, it is possible to adjust the air gap or distance 140 between the first face 64 of the annular magnetic armature member 62 and the pole faces 83 and 85 when the electromagnetic actuating means 90 is de-energized. Furthermore, the friction clutch or brake 100 need not be disassembled in order to permit this adjustment.

As stated previously with reference to FIG. 1, the adjustable friction ring member 52 has a radially inwardly sloping or frusto-conical surface 54 upon which the friction material 55 is suitably secured. The outer surface of the friction material 55 mounted on the adjustable friction ring member 52 engages the frusto-conical inner surface 42 on the outer member 30 when the electromagnetic coil 92 is de-energized. Thus, torque is transferred from the input shaft 12 through the radially extending portion 24 thereof, through the axial splines 28 and 32, respectively, to the outer member 30. Torque is transferred from the outer member 30 to the adjustable friction ring member 52 by means of frictional force between the frusto-conical surface 42 of the input means 10 and the friction material 55 on the adjustable friction ring member 52. Finally, the torque is transferred from the friction ring member 52 through the pin members 130 to the stationary output means 80.

OPERATION OF THE PREFERRED EMBODIMENT

In operation, when the electromagnetic winding 92 is energized, the annular magnetic armature member 62 is moved axially into engagement with the pole faces 83 and 85 of the output body 81. The magnetic engaging forces exerted on the annular magnetic armature member 62 are completely axial and, therefore, provide a closed contact between the pole faces 83 and 85 and the armature member. Under this energized condition, the adjustable friction ring member 52 remains spaced apart from the mating surface 42 of the outer member 30 of the input means 10. Thus, the outer member 30 in the intermediate shaft 16 rotates at the speed of the input shaft 12. In addition, the adjustable friction ring member 52 compresses the biasing means 120 in the axially extending recess 87 of the radially outer body portion 86 of the output body 81. Thus, the adjustable friction ring member 52 in this energized condition is under the influence of a compressive spring force which acts in a direction towards the input means 10.

Upon losing power in the electromagnetic circuit supplying power to the winding 92, the biasing means 120 urge the adjustable friction ring member 52 to move axially away from the output means 80. As the adjustable friction ring member 52 moves towards the input means 10, the inner ring member 70 and the annular magnetic armature member 62 move along with the adjustable friction ring member 52 because of the threaded connection between the first bore 56 and the outer cylindrical surface 71, connecting the inner ring member 70 to the adjustable friction ring member 52 and the connecting means 102 between the inner ring member 70 and the annular magnetic armature member 62. As the adjustable friction ring member 52, the inner ring member 70 and the annular magnetic armature member 62 move towards the input means 10, the inner annular face 46 of the outer member 30, which is rotating with the input shaft 12 comes into contact with the opposite face 74 of the inner ring member 70, which causes the inner ring member 70 to move axially along the threaded connections between the inner ring member 70 and the adjustable friction ring member 52 towards the output means 80. This permits the surface of the friction material 55 on the frusto-conical surface 54 of the adjustable friction ring member 52, which is non-rotational by virtue of its connection through the pin member 130 to the output means 80, to advance into engagement with the first annular face 42 on the frusto-conical annular portion 40 of the outer member 30 of the input means 10. Simultaneously, as the inner ring member 70 threads itself along the adjustable friction ring member 52, almost all torque is transferred from the input means 10 to the adjustable friction ring member 52 through the mating frictional surfaces of their respective members. The adjustment between the inner ring member 70 and the adjustable friction ring member 52 continues until maximum torque is transmitted through the mutual frictional surfaces and rotation is halted.

This initial adjustment only occurs the first time that the friction brake device 100 is engaged. From this time forward, no additional adjustment occurs between the inner ring member 70 and the adjustable friction ring member 52 unless wear is exhibited at the surface of the friction material 55 and the frusto-conical inner surface 42 on the outer member 30. Upon the wearing of either of these surfaces, the inner ring member 70 will again, when the electromagnetic coil 92 is de-energized, adjust itself with respect to the adjustable friction ring member 52 and the annular inner face 46 of the outer member 30 until such time as maximum torque is transmitted through the friction brake device 100.

The inner ring member and the adjustable friction cone member are maintained in exactly the same position relative to each other as in the prior energized position due to the biasing force of the helical biasing means 110. The arcuately shaped end 115 of the first radial end portion 114 of the helical biasing member acts on the first threaded bore 56 of the adjustable friction ring member 52 in such a way as to provide a controlled drag to prevent excessive overadjustment of the inner ring member relative to the friction ring member during the wear adjustment phase, that is, in one direction of relative movement of the inner ring member relative to the adjustable friction ring member. The inner ring member 70 and the friction ring member 52 are maintained in exactly the same position relative to each other as in the prior energized position by the action of the helical biasing means 110. Thus, the abutment end 119 of the second radial end portion 118 acts on the knurled surface 59 of the second inner bore 58 of the adjustable friction ring member 52 to prevent relative motion between the inner ring member and the friction ring member in the opposite direction to prevent relative movement therebetween when the electromagnetic coil 92 is energized. A critical balance is maintained between the inner ring member 70, the annular magnetic armature member 62 and the cap screw (not shown) holding these components together, as well as the helical biasing means 110, to provide constant adjustment in case of wear of the frictional surfaces.

The helical biasing means 110 will only permit the inner ring member 70 to rotate in one direction relative to the adjustable friction ring member. This one-way relative motion between the adjustable friction ring member 52 and the inner ring member 70 will be permitted to occur after the initial adjustment and thereafter when the frictional surfaces wear away. As wear occurs, the same basic cycle, as described above, is repeated and continues to occur until all the friction material wears away.

Note that as wear occurs, there is no loss of torque between the input and output means. The movement between the inner ring member 70 and the adjustable friction ring member 52 is immediate so as to adjust the position of the friction ring member to compensate for any wear that occurs at the frictional surfaces. In addition, the connecting means 102 and the helical biasing means 110 provides a controlled drag on the first threaded bore 56 of the adjustable friction ring member 52 to prevent overadjustment of the inner ring member 70 relative to the adjustable friction ring member 52. Furthermore, the helical biasing means 110 prevents random relative motion or walking between the inner ring member 70 and the adjustable friction ring member 52 because of the biasing force of the first radial end portion 114 acting on the first threaded bore 56 of the adjustable friction ring member 52.

While a preferred embodiment of the invention has been disclosed, it will be apparent to those skilled in the art that changes may be made to the invention as set forth in the appended claims. In some instances, certain features of the invention may be used advantageously without corresponding use of other features. For example, the braking device can be easily used as a clutching device with little or no changes in the basic concepts of the invention disclosed. Accordingly, the heretofore disclosed description is intended to be illustrative of the principles of the invention and not to limit the scope thereof.

What is claimed is:

1. An electromagnetic friction device for torque transmission comprising:
   input means;
   output means coaxially disposed with said input means;

means for translating torque from said input means to said output means, said torque translating means further comprising:

a friction ring member disposed adjacent to said input means;

an inner ring member coaxially disposed with said friction ring member, said inner ring member further being movable rotatably and axially relative said friction ring member;

means for electromagnetically biasing said friction ring member out of engagement with said input means, said electromagnetic biasing means being selectively operable and concentrically disposed with respect to said output means to form a partial circuitous flux path therewith, said electromagnetic biasing means comprising a first magnetic means mounted to said output means;

a second magnetic means mounted to said friction ring member, said first and second magnetic means forming a complete circuitous flux path therebetween;

means for axially adjusting said second magnetic means relative to said friction ring member, said means for axially adjusting further comprising:

means for connecting said inner ring member to said second magnetic means; and helical biasing means mounted to a portion of said connecting means, said helical biasing means comprising a first radial end portion slidably engaging said friction ring member, a second radial end portion abutting said friction ring member, and a body portion between said first radial and second radial end portion, said body portion further being mounted to said connecting means, whereby said body portion of said helical biasing means biases said inner ring member in an axial direction away from said second magnetic means, said first radial end portions biased said friction ring member to create a predetermined rotational drag between said inner ring member and said friction ring member to prevent over-adjustment and said second radial end portion of said helical biasing means abuts said friction ring member to provide undirectional rotation between said inner ring member and said friction ring member.

2. The electromagnetic friction deivce as claimed in claim 1, wherein said friction ring member comprises a threaded inner diameter and wherein said inner ring member further comprises a threaded outer diameter to engage said threaded inner diameter of said friction ring member.

3. The electromagnetic friction device as claimed in claim 2 wherein said first radial end portion slidably engages said threaded inner diameter of said friction ring member to control the movement of said inner ring member along said threaded outer diameter relative to said threaded inner diamenter of said friction ring member.

4. The electromagnetic friction device as claimed in claim 2 wherein said friction ring member further comprises a second inner diameter adjacent said threaded inner diameter, said second inner diameter being larger than said threaded inner diameter.

5. The electromagnetic friction device as claimed in claim 4 wherein said second radial end portion of said helical biasing means is contiguous with said second inner diameter of said friction ring member.

6. The electromagnetic friction device as claimed in claim 4 wherein said second inner diameter further comprises a knurled surface and wherein said second radial end portion of said helical biasing means engages said knurled surface on said second inner diameter to permit rotational movement of said inner ring member relative said friction ring member in one direction of rotation and to prevent rotational movement of said inner ring member relative said friction ring member in the opposite direction of rotation.

7. The electromagnetic friction device as claimed in claim 1 wherein said inner ring member further comprises one face, an opposite face and a portion deifining at least one aperture extending from said one face through said inner ring member to said opposite face.

8. The electromagnetic friction device as claimed in claim 7 wherein said second magnetic means comprises a magnetic armature member having a first face, a second face opposite said first face and a portion defining at least one threaded aperture extending from said first face through said magnetic armature member to said second face.

9. The electromagnetic friction device as claimed in claim 8 wherein said first radial end portion is disposed adjacent to said one face of said inner ring member, said second radial end portion is disposed adjacent to said second face of said magnetic armature member.

10. The electromagnetic friction device as claimed in claim 8 wherein said connecting means further comprises:

a threaded connector having a threaded body portion disposed through said aperture in said inner ring member, said threaded body portion further engaging said threaded aperture in said magnetic armature member.

11. The electromagnetic friction device as claimed in claim 10 wherein said body portion of said helical biasing means is mounted on said threaded connector between said magnetic armature member and said inner ring member.

12. An electromagnetic friction device for torque transmission comprising:

input means;

output means coaxially disposed with said input means;

a friction ring member interposed said input means and said output means, said friction ring member having a threaded inner bore;

an inner ring member having an outer threaded surface threadably connected to said threaded inner bore of said friction ring member;

an electromagnetic coil member concentrically mounted to said output means and said friction ring member;

a magnetic armature member mounted between said friction ring member and said electromagnetic coil member;

means for axially adjusting said magnetic armature member relative to said friction ring member to compensate for wear between said friction ring member and said input means and to maintain a predetermined gap between said magnetic armature member and said electromagnetic coil member;

frictional drag means mounted to said adjusting means such that a frictional drag is imposed on the rotatable movement of said inner ring member with respect to said friction ring member to avoid overcompensation, said frictional drag means further comprising:
a radial biasing portion mounted to said adjusting means, said radial biasing portion cooperating with said threaded inner bore of said friction ring member to create a frictional drag between said inner ring member and said friction ring member such that upon wear of said friction ring member said radial biasing portion frictionally prevents excessive movement between said inner ring member and said friction ring member thereby avoiding overcompensation for wear of said friction ring member; and
unidirectional retarder means mounted to said adjusting means such that said inner ring member is permitted to move in one direction of rotation with respect to said friction ring member, said unidirectional retarder means further permitting no rotatable movement of said inner ring member with respect to said friction ring member in an opposite rotational direction.

13. The electromagnetic friction device as claimed in claim 12 wherein said adjusting means further comprises:
means for connecting said magnetic armature member to said inner ring member; and
first biasing means for urging said friction ring member away from said magnetic armature member.

14. The electromagnetic friction device as claimed in claim 12 wherein said inner ring member further comprises one face, an opposite face and a portion defining at least one aperture extending from said one face to said opposite face and wherein said magnetic armature member has a first face, a second face opposite said first face and a portion defining at least one threaded aperture extending from said first face to said second face.

15. The electromagnetic friction device as claimed in claim 14 wherein said connecting means further comprises:
a threaded connector having a threaded body portion disposed in said aperture in said inner ring member, said threaded body portion further engaging said threaded aperture in said magnetic armature member.

16. An electromagnetic friction device for torque transmission comprising:
input means;
output means coaxially disposed with said input means;
a friction ring member interposed said input means and said output means, said friction ring member having a threaded inner bore;
an inner ring member having an outer threaded surface threadably connected to said threaded inner bore of said friction ring member, said inner ring member comprising one face, an opposite face, and a portion defining at least one aperture extending from said one face to said opposite face;
an electromagnetic coil member concentrically mounted to said output means and said friction ring member;
a magnetic armature member mounted between said friction ring member and said electromagnetic coil member, said magnetic armature member comprising a first face, a second face opposite said first face, and a portion defining at least one threaded aperture extending from said first face to said second face;
adjusting means for axially adjusting said magnetic armature member relative to said friction ring member to compensate for wear between said friction ring member and said input means and to maintain a predetermined gap between said magnetic armature member and said electromagnetic coil member, said adjusting means comprising connecting means for connecting said magnetic armature member to said inner ring member, first biasing means for urging said friction ring member away from said magnetic armature member, and a threaded connector having a threaded body portion disposed in said aperture in said inner ring member, said threaded body portion further engaging said threaded aperture in said magnetic armature member;
frictional drag means mounted to said adjusting means such that a frictional drag is imposed on the rotatable movement of said inner ring member with respect to said friction ring member to avoid overcompensation; and
unidirectional retarder means mounted to said adjusting means such that said inner ring member is permitted to move in one direction of rotation with respect to said friction ring member, said unidirectional retarder means further permitting no rotatable movement of said inner ring member with respect to said friction ring member in an opposite rotational direction, said unidirectional retarder means comprising a knurled inner bore on said friction ring member adjacent to said threaded inner bore, said knurled inner bore being larger than said threaded inner bore, said unidirectional retarder means further comprising a radial biasing portion cooperating with said knurled inner bore of said friction ring member to allow rotation of said inner ring member relative to said friction ring member in one direction of rotation, said radial biasing portion and said knurled inner bore further cooperating to permit no rotational movement of said inner ring member relative to said friction ring member in another opposite direction of rotation.

17. The electromagnetic friction device as claimed in claim 16 wherein said adjusting means further comprises a helical biasing member interposed said magnetic armature member and said inner ring member.

18. The electromagnetic friction device as claimed in claim 16 wherein said frictional drag means further comprises:
a second radial biasing portion mounted to said adjusting means, said second radial biasing portion cooperating with said threaded inner bore of said friction ring member to create a frictional drag between said inner ring member and said friction ring member such that upon wear of said friction ring member said second radial biasing portion frictionally prevents excessive movement between said inner ring member and said friction ring member thereby avoiding overcompensation for wear of said friction ring member.

19. The electromagnetic friction device as claimed in claim 18 wherein said adjusting means further comprises a helical biasing member interposed said magnetic armature member and said inner ring member.

20. The electromagnetic friction device as claimed in claim 19 wherein said helical biasing member further comprises a coil spring and further wherein said radial biasing portion is one end of said coil spring and still further wherein said second radial biasing portion is an opposite end of said coil spring.

* * * * *

UNITED STATES PATENT AND TRADEMARK OFFICE
CERTIFICATE OF CORRECTION

PATENT NO. : 4,566,575
DATED : January 28, 1986
INVENTOR(S) : Thomas Curran Sekella It is certified that error appears in the above-identified patent and that said Letters Patent is hereby corrected as shown below:

Column 2, line 58, delete "expensive" and insert ---- inexpensive ----.

Column 5, line 48, delete "100" and insert ---- 110 ----.

In The Claims

Column 11, line 40, delete "biased" and insert ---- biases ----.

Column 11, line 48, delete "deivce" and insert ---- device ----.

Column 12, line 15, delete "deifining" and insert ---- defining ----.

Signed and Sealed this

Twenty-fourth Day of June 1986

[SEAL]

Attest:

DONALD J. QUIGG

Attesting Officer

Commissioner of Patents and Trademarks